United States Patent
Morelli et al.

(10) Patent No.: US 9,697,854 B1
(45) Date of Patent: Jul. 4, 2017

(54) HEAT ASSISTED MAGNETIC RECORDING WRITE APPARATUS HAVING AN INVERSE TAPERED WAVEGUIDE

(71) Applicant: Western Digital (Fremont), LLC, Fremont, CA (US)

(72) Inventors: Michael V. Morelli, San Jose, CA (US); Sergei Sochava, Sunnyvale, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 15/216,639

(22) Filed: Jul. 21, 2016

(51) Int. Cl.
*G11B 11/00* (2006.01)
*G11B 5/48* (2006.01)
*G11B 5/00* (2006.01)

(52) U.S. Cl.
CPC .... *G11B 5/4866* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,170,448 A | * | 12/1992 | Ackley | G02B 6/12004 385/131 |
| 7,440,660 B1 | * | 10/2008 | Jin | B82Y 10/00 369/112.27 |
| 7,869,309 B2 | * | 1/2011 | Mihalcea | G11B 5/1272 360/59 |
| 8,264,919 B2 | | 9/2012 | Komura | |
| 8,619,511 B1 | | 12/2013 | Iwanabe | |
| 8,923,102 B1 | * | 12/2014 | Shi | G11B 5/314 369/13.32 |
| 9,001,628 B1 | | 4/2015 | Shi | |
| 9,053,716 B1 | | 6/2015 | Matsumoto | |
| 9,111,558 B1 | | 8/2015 | Krichevsky | |
| 9,147,415 B2 | | 9/2015 | Clinton | |
| 9,336,814 B1 | | 5/2016 | Shi | |
| 2004/0008591 A1 | * | 1/2004 | Johns | G11B 5/127 369/13.14 |
| 2004/0081033 A1 | * | 4/2004 | Arieli | G11B 7/08 369/18 |
| 2015/0010266 A1 | | 1/2015 | Webster | |
| 2015/0293299 A1 | | 10/2015 | Xu | |
| 2015/0316720 A1 | | 11/2015 | Yang | |
| 2016/0041340 A1 | | 2/2016 | Shi | |

* cited by examiner

*Primary Examiner* — Peter Vincent Agustin
(74) *Attorney, Agent, or Firm* — Foley & Lardner LLP

(57) ABSTRACT

A heat assisted magnetic recording (HAMR) write apparatus has a media-facing surface (MFS) and includes a pole, coil(s) and a waveguide. The waveguide is optically coupled with a laser and directs energy toward the MFS. The waveguide includes an entrance, a bottom and a mode converter having a core, an inner cladding, high index layer(s) and an outer cladding. The core has sides that diverge in width. The core has a first index of refraction. The outer cladding has a second index of refraction less than the first index of refraction. The inner cladding has a third index of refraction not greater than the second index of refraction. The inner cladding is between the high index layer(s) and the core. The high index layer(s) are between the inner and outer cladding. The high index layer(s) have a high index of refraction greater than the second index of refraction.

19 Claims, 5 Drawing Sheets

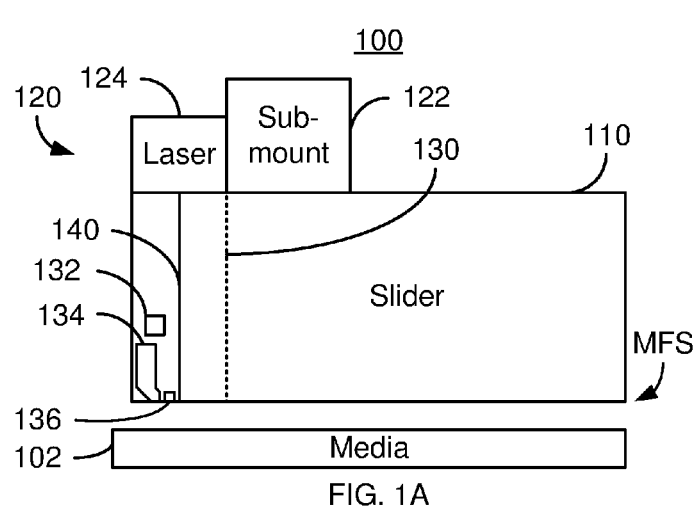
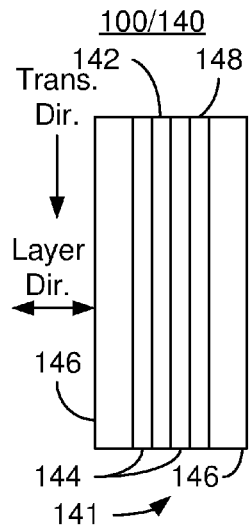
FIG. 1A
FIG. 1B
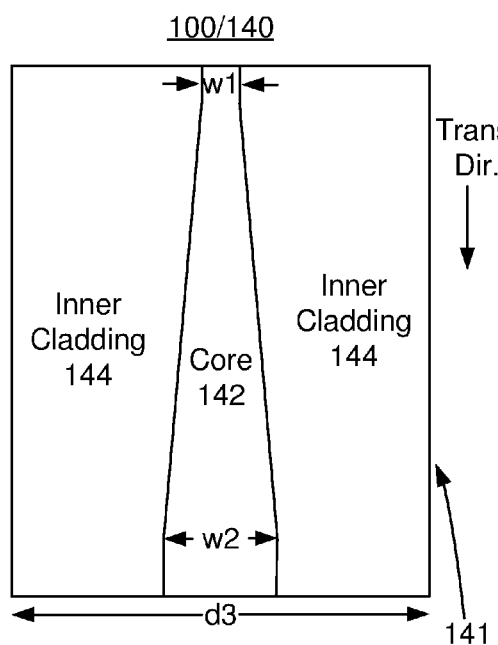
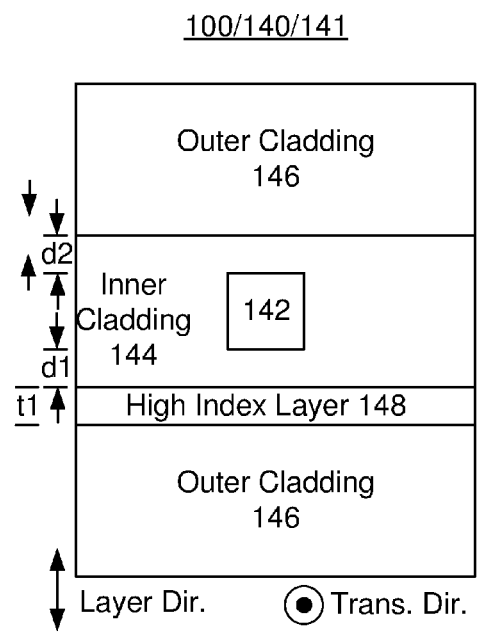
FIG. 1C
FIG. 1D

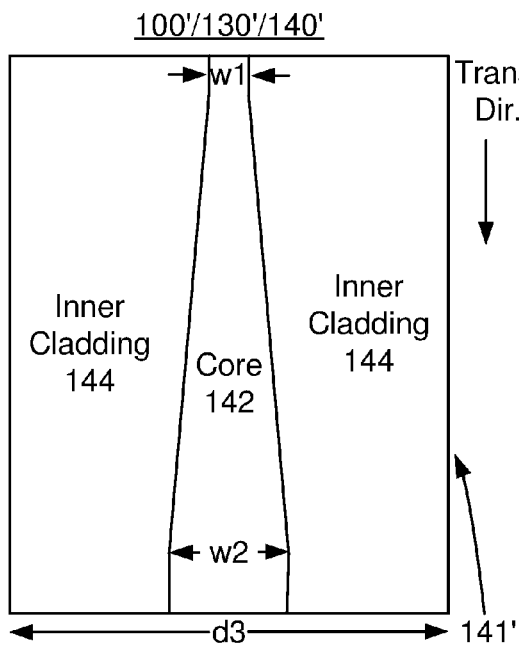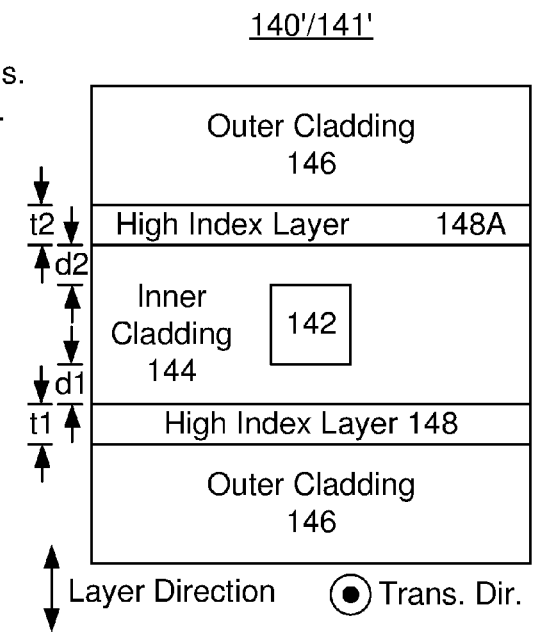
FIG. 2A
FIG. 2B
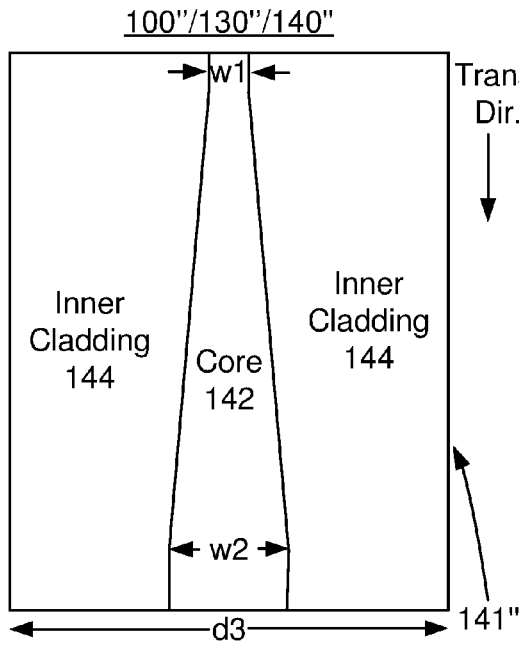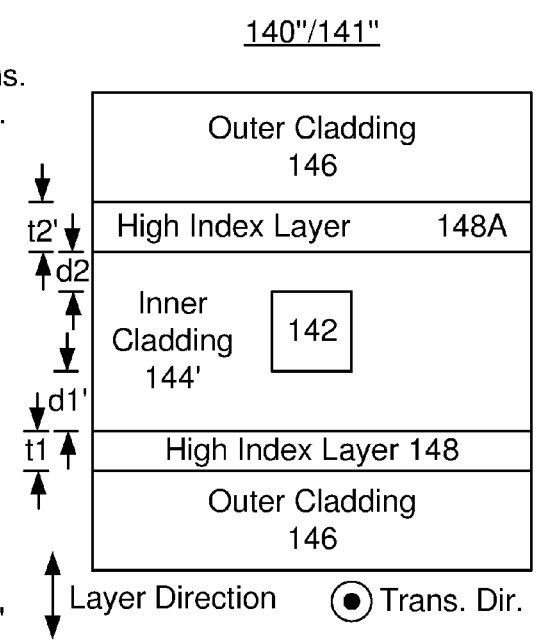
FIG. 3A
FIG. 3B

HEAT ASSISTED MAGNETIC RECORDING WRITE APPARATUS HAVING AN INVERSE TAPERED WAVEGUIDE

BACKGROUND

A heat assisted magnetic recording (HAMR) write apparatus typically includes at least a waveguide, a near-field transducer (NFT), a main pole and a coil for energizing the main pole. The HAMR write apparatus uses light, or energy, received from a laser in order to write to a magnetic recording media. Light from the laser is incident on and coupled into the waveguide. Light is guided by the waveguide to the NFT near the air-bearing surface (ABS). The NFT focuses the light to magnetic recording media, such as a disk. This region is thus heated. The main pole is energized and field from the pole tip is used to write to the heated portion of the recording media.

Although the HAMR write apparatus functions, improvements in performance are still desired. For example, better coupling of the laser light into the media is desirable for improved efficiency. A large waveguide mode size may be beneficial in coupling light from the laser to the waveguide. In contrast, a small, highly confined mode is desirable for efficient coupling from the waveguide to the NFT. Without more, these requirements are in opposition to each other. As a result, efficiency and performance of the HAMR writer may be adversely affected.

BRIEF DESCRIPTION OF SEVERAL VIEWS OF THE DRAWINGS

FIGS. 1A, 1B, 1C and 1D are diagrams depicting side, close up side, plan and MFS cut views of an exemplary embodiment of a portion of a HAMR data storage device.

FIGS. 2A and 2B are diagrams depicting plan and MFS cut views of another exemplary embodiment of a portion of a HAMR data storage device.

FIGS. 3A and 3B are diagrams depicting plan and MFS cut views of another exemplary embodiment of a portion of a HAMR data storage device.

DETAILED DESCRIPTION OF THE PREFERRED EMBODIMENTS

Figure 4:
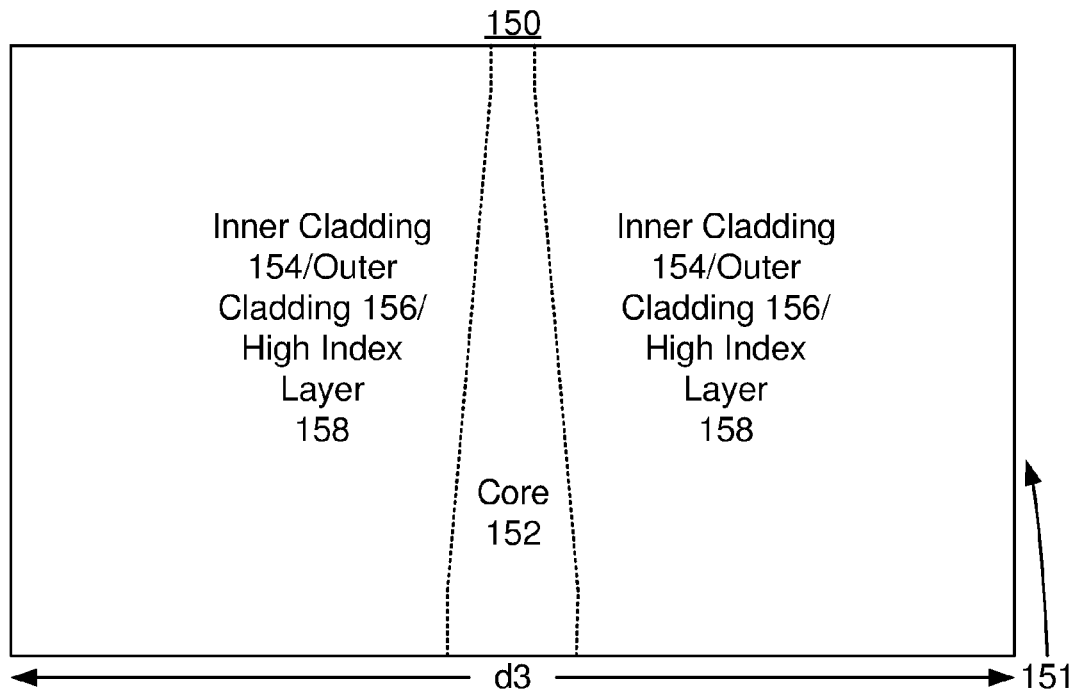
FIG. 4 is a diagram depicting a plan view of another exemplary embodiment of a portion of a HAMR data storage device.

FIGS. 1A, 1B, 1C and 1D depict side, close up side, plan and media-facing surface (MFS) cut views of an exemplary embodiment of a portion of a heat-assisted magnetic recording (HAMR) data storage device 100. The close up side view in FIG. 1B is shown from the same direction as in FIG. 1A. The plan view shown in FIG. 1C is taken along a surface perpendicular to the side view shown in FIG. 1A. The MFS cut view shown in FIG. 1D is taken along a surface parallel to the MFS. For clarity, FIGS. 1A, 1B, C and 1D are not to scale. The HAMR data storage device 100 shown is a disk drive. However, other data storage devices may be used. For simplicity not all portions of the HAMR data storage device 100 are shown. In addition, although the HAMR data storage device 100 is depicted in the context of particular components other and/or different components may be used. For example, circuitry used to drive and control various portions of the HAMR data storage device 100 is not shown. For simplicity, only single components are shown. However, multiples of each component and their sub-components, might be used.

The HAMR data storage device 100 includes media 102, a slider 110, a laser subassembly 120 and a HAMR write apparatus 130. Although not shown, the slider 110, and thus the laser assembly 120 and HAMR write apparatus 130 are generally attached to a suspension. The laser assembly 120 includes a laser 124 and a submount 122. The submount 122 is a substrate to which the laser 124 may be affixed for improved mechanical stability, heat sinking, ease of manufacturing and better robustness. The laser 124 may be a chip such as a laser diode or other laser. Although not shown, the laser subassembly 120 may include a photodetector which samples light tapped from the waveguide 140 of the HAMR write apparatus 130. In some embodiments the laser 124 may be located in a position other than on the slider, but still optically coupled to the waveguide 140.

The HAMR write apparatus 130 is fabricated on the slider 110 and includes a MFS proximate to the media 102 during use. Because the data storage device 100 is a disk drive, the MFS shown is an air-bearing surface (ABS). In some embodiments, the MFS is a different gas-bearing surface, e.g. helium. In general, the HAMR write apparatus 130 and a read apparatus are present in the HAMR data storage device 100. However, for clarity, only the HAMR write apparatus 130 is shown. The HAMR write apparatus 130 includes coil(s) 132, write pole 134, an optional near-field transducer (NFT) 136 and a waveguide 140.

The pole 134 writes to a region of the media 102. The pole 134 is magnetic and may have a high saturation magnetization in excess of 2.0 T. In some embodiments, the saturation magnetization of the pole 134 may be at least 2.4 T. The coils 132 may form a single helical (toroidal) coil or may be a spiral, or pancake, coil. Although depicted as a single layer, multiple layers may be used for the coils 132. Further, although shown as a single coil, multiple coils may be used. The coils 132 are used to energize the pole 134. Although a particular geometry is shown for the pole 134 and coil(s) 132, in another embodiment, other geometries are possible.

The waveguide 140 is optically coupled with the laser 124 and carries light energy from the laser 124 toward the MFS. The waveguide 140 has an entrance further from the MFS and bottom that is both closer to the MFS and wider than the entrance. In some embodiments, the waveguide 140 is butt coupled to the laser 124. Thus, the entrance of the waveguide 140 may be at the back side of the slider 110. The waveguide 140 also includes a mode converter 141, which is used to improve confinement of the mode of light being directed by the waveguide 140. The mode converter 141 is more clearly shown in FIGS. 1B, 1C and 1D. The mode converter 141 has a core 142, inner cladding 144, outer cladding 146 and at least one high index layer 148. The inner cladding 144 is between the core 142 and the outer cladding 146. In addition, the high index layer 148 is between a portion of the inner cladding 144 and the outer cladding 146.

The waveguide 140 and mode converter 141 primarily direct light using the core 142. Therefore, the width and thickness in the layer direction of the core 142 may be considered to be interchangeable with the width and depth of the waveguide 140 and mode converter 141 unless otherwise specified. The sides of the mode converter 141 diverge in the transmission direction (e.g. toward the MFS) and perpendicular to the layer direction (shown in FIGS. 1B and 1D). Stated differently, the mode converter 141 has an inverse taper. As is shown in FIG. 1C, for example, the mode converter entrance has a width w1, while the bottom has a width, w2. The bottom width is wider than the entrance. In the embodiment shown, the thickness of the core 142 does not change along the transmission direction. However, in other embodiments, the thickness of the core 142/mode converter 141 may vary along the transmission direction.

The core 142, inner cladding 144, outer cladding 146 and high index layer 148 are optical materials having various indices of refraction. The core 142 has a core index of refraction. The outer cladding 146 has an outer cladding index of refraction that is less than the core index of refraction. The inner cladding 144 has an inner cladding index of refraction that is not greater than the outer cladding index of refraction. In general, the inner cladding index of refraction is less than the outer cladding index of refraction. The high index layer 148 has a high index of refraction greater than the outer cladding index of refraction. For example, the core 142 may be formed of $Ta_2O_5$ having an index of refraction of approximately 2.1. The high index layer 148 may also be formed of $Ta_2O_5$. The inner cladding 144 may be formed of amorphous silica having an index of refraction of approximately 1.5. In some embodiments, the outer cladding 146 may be made of amorphous alumina having an index of refraction of 1.7. The outer cladding index of refraction is higher than the inner cladding index of refraction. In other embodiments, the outer cladding 146 may also be formed of amorphous silica or the inner cladding 144 may be made of amorphous alumina. In such embodiments, the inner cladding index of refraction is substantially the same as the outer cladding index of refraction. However, the outer cladding index of refraction is generally desired to greater than the inner cladding index of refraction. Although described in the context of tantalum oxide, alumina and silica, other and/or additional material(s) may be used in forming the waveguide 140.

The thickness of the inner cladding 144, the separation between the core 142 and the outer cladding 146 (d2), separation between the core 142 and high index layer 148 (d1), the width of the inner cladding 144 (d3), the thickness of the core in the layer direction and the thickness of the high index layer (t1) are also depicted in FIGS. 1C and 1D. In general, these dimensions are desired to be configured based upon the characteristic wavelength of the laser 124. The laser 124 may be described as producing light of the characteristic wavelength. The actual wavelength of light produced by the laser 124 during operation may vary slightly based on temperature and other operating parameters.

In some embodiments, the core 142 is relatively thin. For example, the core 142 may have a thickness that is less than the characteristic wavelength. In some embodiments, the core thickness is not more than one-third multiplied by the characteristic wavelength. Further, the width, w1, of the core 142 at the mode converter entrance may also be not more than one-third of the characteristic wavelength. In some embodiments, w1 is at least one-fourth of the characteristic wavelength and not more than one-third of the characteristic wavelength. The core 142 widens as the mode converter 141 sides diverge. For example, the width, w2, of the bottom of the mode converter 141 may be at least one-half multiplied by the characteristic wavelength and not more than three-fourth multiplied by the characteristic wavelength. However, other widths w1 and w2 and core thicknesses are possible.

The inner cladding 144 extends from the core 142 in a direction perpendicular to a transmission direction and perpendicular to a layer direction a distance that is at least 1.5 multiplied by the characteristic wavelength. Thus, the width, d3 is at least three multiplied by the characteristic wavelength. In some embodiments, d3 is at least four multiplied by the characteristic wavelength. However, other widths of the inner cladding 144 are possible. For example, the inner cladding 144 may have a width that is significantly larger than four multiplied by the characteristic wavelength. The inner cladding 144 may also extend from the core 142 in the layer direction an amount at least 1/16 multiplied by the characteristic wavelength and not more than 1/4 multiplied by the characteristic wavelength. Thus d1 and d2 may each be at least 1/16 multiplied by the characteristic wavelength and not more than 1/4 multiplied by the characteristic wavelength. Other values of d1 and d2 are possible. In the embodiment shown, d1 and d2 are equal. However, in other embodiments, d1 and d2 may differ.

Because the inner cladding 144 may extend at least 1/16 multiplied by the characteristic wavelength and not more than 1/4 multiplied by the characteristic wavelength, the high index layer 148 may also be this distance from the core 142. Note that although shown below the core 142, the high index layer 148 may be located above the core in another embodiment. The high index layer 148 may be desired to extend as far as the inner cladding 144 in the direction perpendicular to the layer and transmission directions. Stated differently, the high index layer 148 may have a width of d3 in this direction. Thus, the width of the high index layer 148, d3, is at least three multiplied by the characteristic wavelength. In some embodiment, this width is at least four multiplied by the characteristic wavelength. However, other widths of the high index layer 148 are possible. The thickness, t1, of the high index layer 148 may be at least 1/16 multiplied by the characteristic wavelength and not more than 1/4 multiplied by the characteristic wavelength. Other values of t1 are possible. Further, the high index layer 148 may extend along the core 142 in the transmission direction for all of the mode converter 141. In such embodiments, the high index layer 148 extends along the core 142 in the transmission direction at least as long as a mode converter length.

Thus, the waveguide 140 include a mode converter 141 having diverging sides. The mode converter 141 also includes a core 142, inner cladding 144, outer cladding 146 and high index layer 148. In some embodiments, the inner cladding 144, outer cladding 146 and/or high index layer 148 may terminate at or near the end of the mode converter 141. In other embodiments, the inner cladding 144, outer cladding 146 and/or high index layer 148 may extend along the entire waveguide 140. The core 142 extends along all of the waveguide 140. The waveguide 140 thus couples light energy from the laser 124, reduces the mode size using the mode converter 141 and directs the energy toward the MFS.

The NFT 136 couples a portion of the energy from the waveguide 140 to the media 102. The NFT 136 resides at or near the MFS and utilizes surface plasmons to focus the light to the magnetic recording media 102. The NFT 136 couples the energy of the surface plasmons efficiently into the recording medium layer of the media 102 with a confined spot which is much smaller than the optical diffraction limit. This confined spot can rapidly heat the recording medium layer to near or above the Curie point of the media 102. High density bits can be written on a high coercivity medium with the pole 134 energized by the coils 132 to a modest magnetic field. In the embodiment shown, the NFT 136 occupies part of the MFS and may be formed of Au or an Au alloy. In an alternate embodiment, the NFT 136 might be recessed from the MFS. The NFT 136 might be formed of another material and/or have another shape in other embodiments.

The HAMR data storage device 100 may exhibit improved performance. The mode converter 141 having a core 142 with diverging sides can efficiently reduce the size of the mode carried by the waveguide. Use of the inner cladding 144 that may have a lower inner cladding index of refraction allows the mode expansion peak, at which optical coupling efficiency is higher, to occur for higher core 142 widths (dimension perpendicular to transmission and layer directions). Stated differently, the mode may be more efficiently reduced in size while maintaining power at higher widths of the core 142. Consequently, the aspect ratio, or height divided by width of the core 142 is decreased. A waveguide 140 having a lower aspect ratio may be easier to manufacture. The use of the inner cladding 144 such as amorphous silica may also improve the reliability of the HAMR write apparatus 130. The high index layer 148 may operate to stretch the optical mode in the layer direction (perpendicular to transmission direction). This allows the input mode of the laser 124 to be better matched by the waveguide 140. Efficiency of the waveguide 140 may thus be improved. As a result, the waveguide 140 is better able to couple light energy in from the laser 124 and provide energy to the NFT 136. More energy is made available for heating the media 102. Performance, manufacturability and reliability of the HAMR write apparatus 130 and the data storage device 100 may, therefore, be enhanced.

FIGS. 2A and 2B depict plan and MFS cut views of another exemplary embodiment of a portion of the HAMR data storage device 100' and write apparatus 130'. For clarity, FIGS. 2A-2B are not to scale. For simplicity not all portions of the HAMR data storage device 100' are shown. In addition, although the HAMR disk drive 100' is depicted in the context of particular components other and/or different components may be used. Further, the arrangement of components may vary in different embodiments. The HAMR disk drive 100' is analogous to the HAMR disk drive 100. Consequently, similar components have analogous labels. The HAMR write apparatus 130' thus includes waveguide 140', pole (not shown in FIGS. 2A-2B), coil(s) (not shown in FIGS. 2A-2B) and optional NFT (not shown in FIGS. 2A-2B) that are analogous to the waveguide 140, pole 134, coil(s) 132 and optional NFT 136, respectively.

The waveguide 140' includes a mode converter 141' and a core 142 that are analogous to the mode converter 141 and core 142 of the waveguide 140. Thus, the core 142, inner cladding 144 and outer cladding 146 are analogous to the core 142, inner cladding 144 and outer cladding 146 of the waveguide 140. The dimensions d1, d2, d3, t1, w1 and w2 are analogous to those described above with respect to the waveguide 140.

The mode converter 141' includes high index layer 148. In addition, a second high index layer 148A is also provided. The high index layer 148A may be formed of the same or different material(s) as the high index layer 148. However, the high index layer 148A still has a high index of refraction that is greater than the outer cladding index of refraction and the inner cladding index of refraction. In some embodiments the high index layer 148A has a high index of refraction that is not less than the core index of refraction. For example, the high index layer 148A may also be formed of $Ta_2O_5$. The high index layers 148 and 148A are shown as being the same distance from the core 142. However, in other embodiments, the high index layers 148 and 148A may be different distance from the core 142. The high index layer 148A has a thickness t2 that is at least 1/16 multiplied by the characteristic wavelength and not more than ¼ multiplied by the characteristic wavelength. The thickness t2 may be the same as or different from the thickness t1. Further, the high index layer 148A may extend along the core 142 in the transmission direction for at least the length of the mode converter 141.

The HAMR data storage device 100' and write apparatus 130' may share the benefits of the HAMR data storage device 100 and write apparatus 130, respectively. The core 142 may have a lower aspect ratio while maintaining the ability to couple in light from the laser 124 and reduce the mode size. Efficiency and fabrication of the waveguide 140' may thus be improved. Use of a lower index of refraction inner cladding 144 may also improve reliability of the HAMR data storage device 100' and write apparatus 130'. More energy may made available for heating the media 102. Performance, manufacturability and reliability of the HAMR write apparatus 130' and the HAMR data storage device 100' may, therefore, be enhanced.

FIGS. 3A and 3B depict plan and MFS cut views of another exemplary embodiment of a portion of the HAMR data storage device 100" and write apparatus 130". For clarity, FIGS. 3A-3B are not to scale. For simplicity not all portions of the HAMR data storage device 100" are shown. In addition, although the HAMR disk drive 100" is depicted in the context of particular components other and/or different components may be used. Further, the arrangement of components may vary in different embodiments. The HAMR disk drive 100" is analogous to the HAMR disk drive(s) 100 and/or 100'. Consequently, similar components have analogous labels. The HAMR write apparatus 130" thus includes waveguide 140", pole (not shown in FIGS. 3A-3B), coil(s) (not shown in FIGS. 3A-3B) and optional NFT (not shown in FIGS. 3A-3B) that are analogous to the waveguide 140, pole 134, coil(s) 132 and optional NFT 136, respectively.

The waveguide 140" includes a mode converter 141" and a core 142 that are analogous to the mode converter 141 and core 142 of the waveguide 140. Thus, the core 142, inner cladding 144', outer cladding 146, high index layer 148 and high index layer 148A are analogous to the core 142, inner cladding 144, outer cladding 146, high index layer 148 and high index layer 148A of the waveguide(s) 140 and 140'. The dimensions d1', d2, d3, t1, t2', w1 and w2 are analogous to the dimensions d1, d2, d3, t1, t2, w1 and w2 for the waveguide(s) 140 and/or 140'.

The high index layer 148A is a different distance from the core 142 than the high index layer 148. In other words, d1' is different from d2. In the embodiment shown, d1' is greater than d2. In other embodiments, d1' might be less than d2. Similarly, the thicknesses of the high index layers 148 and 148A are different (t1≠t2'). In the embodiment shown, t2' is greater than t1. However, in other embodiments, t2' may be less than or equal to t1.

The HAMR data storage device 100" and write apparatus 130" may share the benefits of the HAMR data storage device 100/100' and write apparatus 130/130', respectively. The core 142 may have a lower aspect ratio while maintaining the ability to couple in light from the laser 124 and reduce the mode size. Efficiency and fabrication of the waveguide 140" may thus be improved. Use of a lower index of refraction inner cladding 144' may also improve reliability of the HAMR data storage device 100" and write apparatus 130". More energy may made available for heating the media 102. Performance, fabrication and reliability of the HAMR write apparatus 130" and the HAMR data storage device 100" may, therefore, be enhanced.

FIG. 4 depicts a plan view of another exemplary embodiment of a portion of a waveguide 150 for a HAMR write apparatus such as the HAMR write apparatus 130, 130' and/or 130". Thus, the waveguide 150 may be used in the HAMR data storage device 100, 100' and/or 100". For clarity, FIG. 4 is not to scale. For simplicity not all portions of the waveguide 150 are shown. In addition, although the waveguide 150 is depicted in the context of particular components other and/or different components may be used. Further, the arrangement of components may vary in different embodiments.

The waveguide 150 includes a mode converter 151, a core 152, inner cladding 154, outer cladding 156 and one or more high index layer(s) 158 that are analogous to the mode converter 141/141'/141", core 142, inner cladding 144/144' and high index layer(s) 148/148A of the waveguide(s) 140, 140' and/or 140". The dimensions and indices of refraction of the waveguide 150 are analogous to the dimensions d1/d1', d2, d3, t1, t2/t2', w1 and w2 and indices of refraction for the waveguide(s) 140, 140' and/or 140".

The high index layer(s) 158 and inner cladding 154 are shown as extending a distance d3 in the side direction perpendicular to the transmission and layer directions. However, in some embodiments, the high index layer(s) 158 and inner cladding 154 may extend further sideways. In general, as long as the high index layer(s) 158 and inner cladding 154 extend at least the distance d3 in the side direction, the actual width of these layers 154 and 158 becomes less important. For example, the high index layer(s) 158 and inner cladding 154 may extend to the edges of the slider.

A HAMR data storage device and HAMR write apparatus using the waveguide 150 may share the benefits of the HAMR data storage device 100/100'/100" and write apparatus 130/130'/130", respectively. The core 152 may have a lower aspect ratio while maintaining the ability to couple in light from the laser and reduce the mode size. Efficiency and fabrication of the waveguide 150 may thus be improved. Use of the lower index of refraction inner cladding 154 may also improve reliability of the HAMR data storage device and write apparatus using the waveguide 150. More energy may made available for heating the media. Performance and reliability of the HAMR write apparatus and the HAMR data storage device in which the waveguide 150 is used may, therefore, be enhanced.

Figure 5:
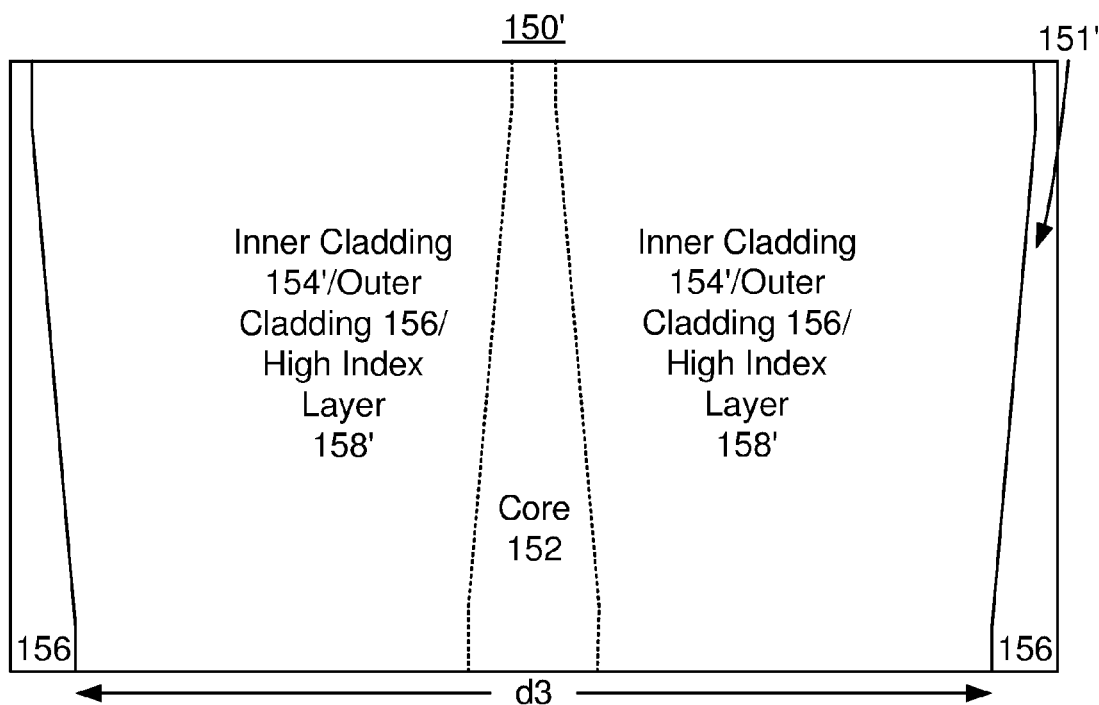
FIG. 5 is a diagram depicting a plan view of another exemplary embodiment of a portion of a HAMR data storage device.

FIG. 5 depicts a plan view of another exemplary embodiment of a portion of a waveguide 150' for a HAMR write apparatus such as the HAMR write apparatus 130, 130' and/or 130". Thus, the waveguide 150' may be used in the HAMR data storage device 100, 100' and/or 100". The waveguide 150' is analogous to the waveguide 150. For clarity, FIG. 5 is not to scale. For simplicity not all portions of the waveguide 150' are shown. In addition, although the waveguide 150' is depicted in the context of particular components other and/or different components may be used. Further, the arrangement of components may vary in different embodiments.

The waveguide 150' includes a mode converter 151', a core 152, inner cladding 154', outer cladding 156 and one or more high index layer(s) 158' that are analogous to the mode converter 151, core 152, inner cladding 154, outer cladding 156 and high index layer(s) 158 of the waveguide 150. The dimensions and indices of refraction of the waveguide 150' are analogous to the dimensions d1/d1', d2, d3, t1, t2/t2', w1 and w2 and indices of refraction for the waveguide(s) 140, 140' and/or 140".

The high index layer(s) 158' and inner cladding 154' are shown as extending a distance d3 in the side direction perpendicular to the transmission and layer directions near the bottom of the mode converter 151'. However, the high index layer(s) 158' and inner cladding 154' are patterned to be forward tapered. Consequently, the outer cladding 156 may extend further sideways than the inner cladding 154' and high index layer(s) 158'. In other embodiments, the inner cladding 158' and/or high index layer(s) 158' may be inversely tapered in a manner analogous to the core.

A HAMR data storage device and HAMR write apparatus using the waveguide 150' may share the benefits of the HAMR data storage device 100/100'/100" and write apparatus 130/130'/130", respectively. The core 152 may have a lower aspect ratio while maintaining the ability to couple in light from the laser and reduce the mode size. Efficiency and fabrication of the waveguide 150' may thus be improved. Use of the lower index of refraction inner cladding 154' may also improve reliability of the HAMR data storage device and write apparatus using the waveguide 150'. More energy may made available for heating the media. Performance and reliability of the HAMR write apparatus and the HAMR data storage device in which the waveguide 150' is used may be enhanced.

Figure 6:
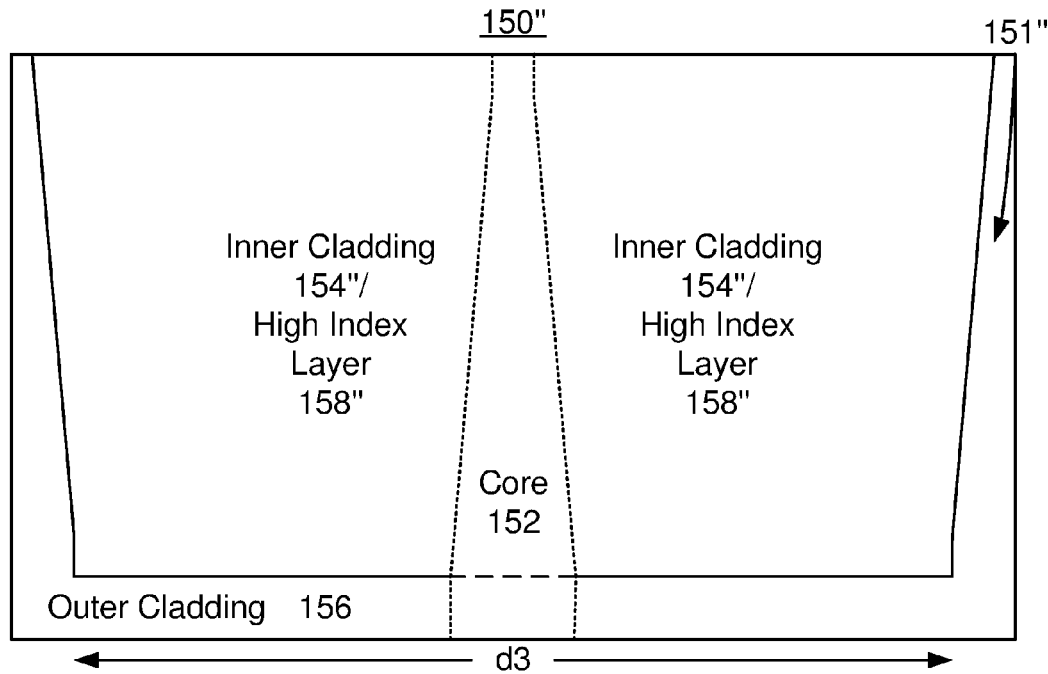
FIG. 6 is a diagram depicting a plan view of another exemplary embodiment of a portion of a HAMR data storage device.

FIG. 6 depicts a plan view of another exemplary embodiment of a portion of a waveguide 150" for a HAMR write apparatus such as the HAMR write apparatus 130, 130' and/or 130". Thus, the waveguide 150" may be used in the HAMR data storage device 100, 100' and/or 100". The waveguide 150" is analogous to the waveguide(s) 150 and/or 150'. For clarity, FIG. 6 is not to scale. For simplicity not all portions of the waveguide 150" are shown. In addition, although the waveguide 150" is depicted in the context of particular components other and/or different components may be used. Further, the arrangement of components may vary in different embodiments.

The waveguide 150" includes a mode converter 151", a core 152, inner cladding 154", outer cladding 156 and one or more high index layer(s) 158" that are analogous to the mode converter 151/151', core 152, inner cladding 154/154', outer cladding 156 and high index layer(s) 158/158' of the waveguide 150/150'. The dimensions and indices of refraction of the waveguide 150" are analogous to the dimensions d1/d1', d2, d3, t1, t2/t2', w1 and w2 and indices of refraction for the waveguide(s) 140, 140' and/or 140".

The high index layer(s) 158" and inner cladding 154" are shown as extending a distance d3 in the side direction perpendicular to the transmission and layer directions near the bottom of the mode converter 151". The inner cladding 154" and high index layer(s) 158" are also forward tapered. However, the inner cladding 154" and high index layer(s) 158" do not extend in the transmission direction along the entire waveguide 150". Consequently, the outer cladding 156 may extend further sideways and along the transmission direction than the inner cladding 154" and high index layer(s) 158".

A HAMR data storage device and HAMR write apparatus using the waveguide 150" may share the benefits of the HAMR data storage device 100/100'/100" and write apparatus 130/130'/130", respectively. The core 152 may have a lower aspect ratio while maintaining the ability to couple in light from the laser and reduce the mode size. Efficiency and fabrication of the waveguide 150" may thus be improved. Use of the lower index of refraction inner cladding 154" may also improve reliability of the HAMR data storage device and write apparatus using the waveguide 150". More energy may made available for heating the media. Performance and reliability of the HAMR write apparatus and the HAMR data storage device in which the waveguide 150" is used may be enhanced.

Figure 7:
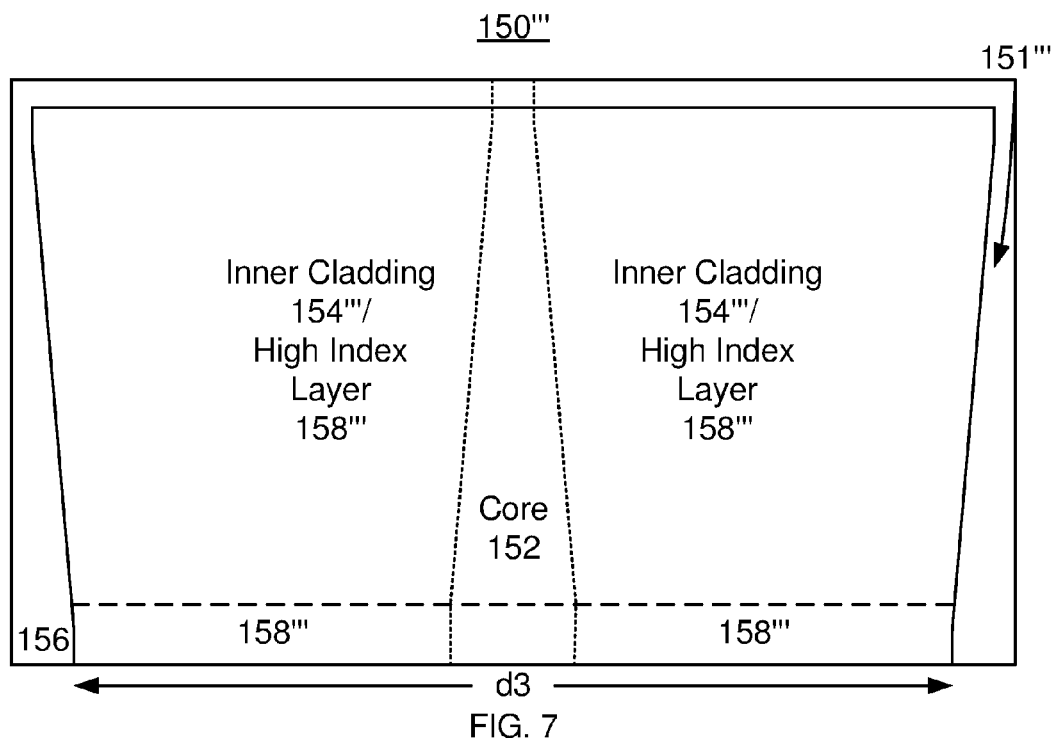
FIG. 7 is a diagram depicting a plan view of another exemplary embodiment of a portion of a HAMR data storage device.

FIG. 7 depicts a plan view of another exemplary embodiment of a portion of a waveguide 150''' for a HAMR write apparatus such as the HAMR write apparatus 130, 130' and/or 130". Thus, the waveguide 150''' may be used in the HAMR data storage device 100, 100' and/or 100". The waveguide 150''' is analogous to the waveguide(s) 150, 150' and/or 150". For clarity, FIG. 7 is not to scale. For simplicity not all portions of the waveguide 150''' are shown. In addition, although the waveguide 150''' is depicted in the context of particular components other and/or different components may be used. Further, the arrangement of components may vary in different embodiments.

The waveguide 150''' includes a mode converter 151''', a core 152, inner cladding 154''', outer cladding 156 and one or more high index layer(s) 158''' that are analogous to the mode converter 151/151'/151", core 152, inner cladding 154, outer cladding 156/156'/156" and high index layer(s) 158/158'/158" of the waveguide 150/150'/150". The dimensions and indices of refraction of the waveguide 150''' are analogous to the dimensions d1/d1', d2, d3, t1, t2/t2', w1 and w2 and indices of refraction for the waveguide(s) 140, 140' and/or 140".

The high index layer(s) 158''' and inner cladding 154''' are shown as extending a distance d3 in the side direction perpendicular to the transmission and layer directions near the bottom of the mode converter 151'''. The inner cladding 154''' and high index layer(s) 158''' also have a forward taper. The inner cladding 154''' and high index layer(s) 158''' do not extend in the transmission direction along the entire waveguide 150'''. Consequently, the outer cladding 156 may extend further sideways and along the transmission direction than the inner cladding 154''' and high index layer(s) 158'''. In addition, the inner cladding 154''' and high index layer(s) 158''' extend different distances along the core 152.

A HAMR data storage device and HAMR write apparatus using the waveguide 150''' may share the benefits of the HAMR data storage device 100/100'/100" and write apparatus 130/130'/130", respectively. The core 152 may have a lower aspect ratio while maintaining the ability to couple in light from the laser and reduce the mode size. Efficiency and fabrication of the waveguide 150''' may thus be improved. Use of the lower index of refraction inner cladding 154''' may also improve reliability of the HAMR data storage device and write apparatus using the waveguide 150'''. More energy may made available for heating the media. Performance and reliability of the HAMR write apparatus and the HAMR data storage device in which the waveguide 150''' is used may be enhanced.

Various features of the HAMR write apparatus, waveguide, and mode converter are highlighted in FIGS. 1A-7. One of ordinary skill in the art will readily recognize that one or more of these features may be combined in manners not explicitly described herein.

Figure 8:
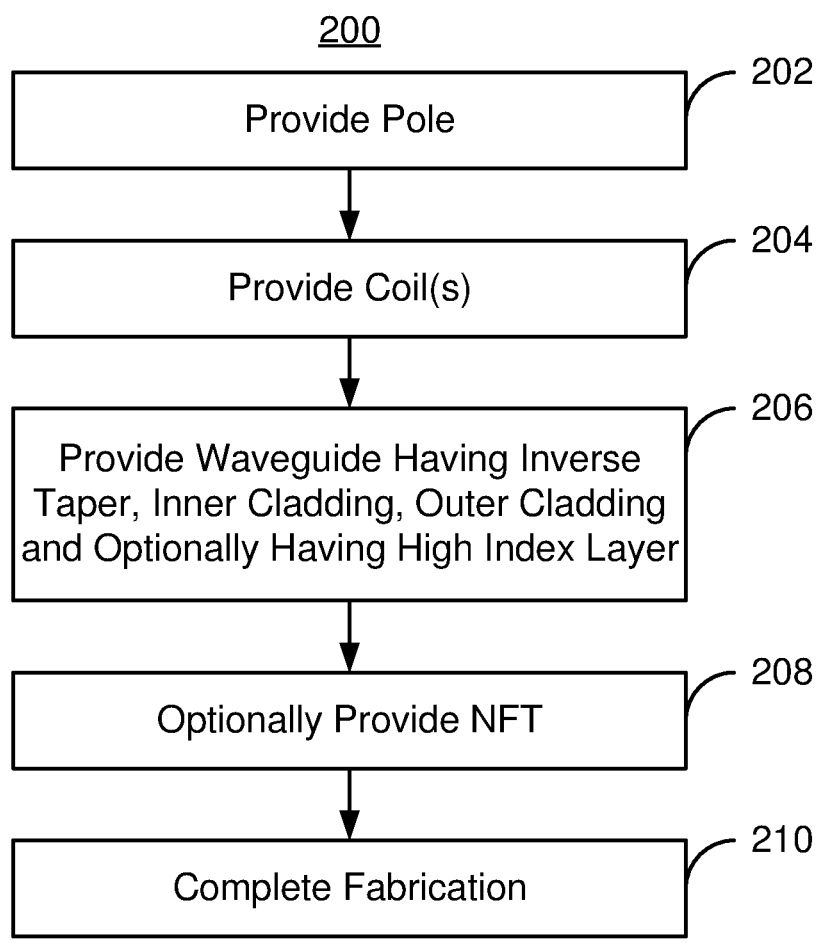
FIG. 8 is a flow chart depicting an exemplary embodiment of a method for fabricating a HAMR write apparatus.

FIG. 8 is a flow chart depicting an exemplary embodiment of a method 200 for fabricating a HAMR write apparatus. The method 200 may be used in fabricating data storage devices such as the disk drives 100, 100' and/or 100" using one or more of the features of the waveguides 140, 140', 140", 150, 150', 150" and/or 150''', though other writers might be so fabricated. For clarity, the method 200 is described in the context of the HAMR data storage device 100 depicted in FIGS. 1A-1D. For simplicity, some steps may be omitted, performed in another order, interleaved and/or combined. The HAMR data storage device being fabricated may include a write apparatus and a read apparatus (not shown) and resides on a slider. For simplicity, however, fabrication of the read apparatus is not discussed. The method 200 is also described in the context of forming a single write apparatus. However, the method 200 may be used to fabricate multiple write apparatus(es) at substantially the same time. The method 200 and system are also described in the context of particular layers. However, in some embodiments, such layers may include multiple sublayers. The method 200 also may commence after formation of other portions of the data storage device.

A pole 134 is formed, via step 202. Step 202 may include multiple substeps such as forming a trench for the main pole in a nonmagnetic layer, plating the high saturation magnetization material(s) for the main pole and planarizing these materials. At least one coil 132 for energizing the main pole is provided, via step 204. Step 204 generally includes multiple deposition and removal steps to form the coil. The coil 132 may be a spiral coil, a toroidal coil or have another shape.

The waveguide 140 is provided, via step 206. Thus, waveguide is configured so that it may be optically coupled with the laser and direct a portion of the laser's energy toward the MFS. The waveguide 140 formed in step 206 includes a mode converter 141 having an inverse taper. Thus, the sides of the core 142/mode converter 141 diverge. The mode converter 141 also has inner cladding 144, high index layer(s) 148 and/or 148A and outer cladding 146. The core 142, inner cladding 144, outer cladding 146 and high index layer(s) 148 and/or 148A have the indices of refraction described above. Step 206 may include depositing a portion of the outer cladding, optionally depositing a high index material, depositing part of the inner cladding and depositing a layer of core material on the inner cladding layer. Step 206 may also include patterning the core material to form the core 142 and refilling the region with additional inner cladding material. Another high index of refraction material and the remainder of the outer cladding may also be provided. Because the aspect ratio (thickness divided by width) of the core 142 is reduced, fabrication in step 206 may be simplified. For example, patterning of the core 142 and refill using the inner cladding may be more easily and better achieved. In other embodiments, other method(s) may be used to form the waveguide 140.

The NFT 136 is optionally provided, via step 208. Step 208 may include one or more steps of depositing metal layers and patterning the layers to form the NFT 136. Fabrication of the HAMR writer apparatus 100 may then be completed, via step 210.

Using the method 200, the HAMR data storage device(s) 100, 100' and/or 100" including waveguide(s) 140, 140', 140", 150, 150', 150" and/or 150''' may be fabricated. The benefit(s) of one or more of the HAMR disk drive(s) 100, 100' and/or 100" may thus be achieved.

We claim:

1. A heat assisted magnetic recording (HAMR) write apparatus coupled with a laser for providing energy and having a media-facing surface (MFS), the HAMR write apparatus comprising:

a pole;

at least one coil for energizing the pole; and a waveguide optically coupled with the laser and directing a portion of the energy toward the MFS, the waveguide including an entrance distal from the MFS, a bottom proximate to the MFS and a mode converter having a core, an inner cladding, at least one high index layer, and an outer cladding, the core having sides diverging from a first width proximate to the entrance to a second width distal from the entrance, the first width being less than the second width, the core having a core index of refraction, the inner cladding having an inner cladding index of refraction, the outer cladding having an outer cladding index of refraction, the inner cladding index of refraction being not greater than the outer cladding index of refraction, the outer cladding index of refraction being less than the core index of refraction, the inner cladding being between the at least one high index layer and the core, the at least one high index layer being between the inner cladding and the outer cladding, the at least one high index layer having a high index of refraction greater than the outer cladding index of refraction.

2. The HAMR write apparatus of claim 1 further comprising:

a near-field transducer (NFT) optically coupled with the waveguide.

3. The HAMR write apparatus of claim 1 wherein the laser has a characteristic wavelength and wherein the inner cladding extends from the core at least 1.5 multiplied by the characteristic wavelength in a direction, the direction being perpendicular to a transmission direction in the mode converter and perpendicular to a layer direction.

4. The HAMR write apparatus of claim 3 wherein the inner cladding extends from the core at least 1/16 multiplied by the characteristic wavelength and not more than 1/4 multiplied by the characteristic wavelength in the layer direction.

5. The HAMR write apparatus of claim 1 wherein the laser has a characteristic wavelength and wherein the at least one high index layer extends from the core at least 1.5 multiplied by the characteristic wavelength in a direction, the direction being perpendicular to a transmission direction in the mode converter and perpendicular to a layer direction.

6. The HAMR write apparatus of claim 1 wherein the laser has a characteristic wavelength and wherein the at least one high index layer is a distance from the core at least 1/16 multiplied by the characteristic wavelength and not more than 1/4 multiplied by the characteristic wavelength in a layer direction perpendicular to a transmission direction in the mode converter.

7. The HAMR write apparatus of claim 1 wherein the laser has a characteristic wavelength and wherein the at least one high index layer has a thickness of at least 1/16 multiplied by the characteristic wavelength and not more than 1/4 multiplied by the characteristic wavelength.

8. The HAMR write apparatus of claim 1 wherein the at least one high index layer extends along the core in a transmission direction at least as long as a mode converter length.

9. The HAMR write apparatus of claim 1 wherein the at least one high index layer includes a first high index layer and a second high index layer, the core being between the first high index layer and the second high index layer.

10. The HAMR write apparatus of claim 1 wherein the core includes tantalum oxide, the inner cladding includes silica, the outer cladding includes alumina and the at least one high index layer includes tantalum oxide.

11. The HAMR write apparatus of claim 1 wherein the laser has a characteristic wavelength and wherein the first width is not more than 1/3 multiplied by the characteristic wavelength.

12. The HAMR write apparatus of claim 11 wherein the core has a thickness at the entrance, the thickness being not more than 1/3 multiplied by the characteristic wavelength.

13. A heat assisted magnetic recording (HAMR) data storage device comprising:

a media;

a laser for providing energy; and a slider including a HAMR write apparatus having a media-facing surface (MFS), the HAMR write apparatus including a pole, at least one coil for energizing the pole and a waveguide, the waveguide being optically coupled with the laser and directing a portion of the energy toward the MFS, the waveguide including an entrance distal from the MFS, a bottom proximate to the MFS and a mode converter, the mode converter having a core, an inner cladding, at least one high index layer and an outer cladding, the core having sides diverging from a first width proximate to the entrance to a second width distal from the entrance, the first width being less than the second width, the core having a core index of refraction, the inner cladding having an inner cladding index of refraction, the outer cladding having an outer cladding index of refraction, the inner cladding index of refraction being less than the outer cladding index of refraction, the outer cladding index of refraction being less than the core index of refraction, the inner cladding being between the at least one high index layer and the core, the at least one high index layer being between the inner cladding and the outer cladding, the at least one high index layer having a high index of refraction greater than the outer cladding index of refraction.

14. The HAMR data storage device of claim 13 wherein the laser has a characteristic wavelength and wherein the at least one high index layer extends from the core at least 1/16 multiplied by the characteristic wavelength and not more than 1/4 multiplied by the characteristic wavelength in the layer direction.

15. The HAMR data storage device of claim 13 wherein the core includes tantalum oxide, the inner cladding includes silica and the outer cladding includes alumina and the high index layer includes tantalum oxide.

16. A method for fabricating a heat assisted magnetic recording (HAMR) write apparatus coupled with a laser for providing energy and having a media-facing surface (MFS), the method comprising:

providing a pole;

providing at least one coil for energizing the pole; and providing a waveguide optically coupled with the laser and directing a portion of the energy toward the MFS, the waveguide including an entrance distal from the MFS, a bottom proximate to the MFS and a mode converter, the mode converter having a core, an inner cladding, at least one high index layer and an outer cladding, the core having sides diverging from a first width proximate to the entrance to a second width distal from the entrance, the first width being less than the second width, the core having a core index of refraction, the inner cladding having an inner cladding index of refraction, the outer cladding having an outer cladding index of refraction, the inner cladding index of refraction being less than the outer cladding index of refraction, the outer cladding index of refraction being less than the core index of refraction, the inner cladding being between the outer cladding and the core, the at least one high index layer being between the inner cladding and the outer cladding, the at least one high index layer having a high index of refraction greater than the outer cladding index of refraction.

17. The method of claim 16 wherein the laser has a characteristic wavelength and wherein the at least one high index layer extends from the core at least 1.5 multiplied by the characteristic wavelength in a direction, the direction being perpendicular to a transmission direction in the mode converter and perpendicular to a layer direction.

18. The method of claim 16 the laser has a characteristic wavelength and wherein the high index layer is a distance from the core, the distance being at least $\frac{1}{16}$ multiplied by the characteristic wavelength and not more than $\frac{1}{4}$ multiplied by the characteristic wavelength in the layer direction.

19. The method of claim 16 wherein the laser has a characteristic wavelength and wherein the at least one high index layer has a thickness of at least $\frac{1}{16}$ multiplied by the characteristic wavelength and not more than $\frac{1}{4}$ multiplied by the characteristic wavelength.

* * * * *